United States Patent [19]

King, Jr. et al.

[11] Patent Number: 5,597,887
[45] Date of Patent: Jan. 28, 1997

[54] BRANCHED POLYCARBONATE PREFORMS, BLOW MOLDABLE POLYCARBONATE AND METHOD FOR MAKING

[75] Inventors: Joseph A. King, Jr., Niskayuna; Patrick J. McCloskey, Watervliet; Alice M. Colley, Latham; David M. Dardaris, Ballston Spa, all of N.Y.

[73] Assignee: General Electric Company, Schenectady, N.Y.

[21] Appl. No.: 501,898

[22] Filed: Aug. 9, 1995

Related U.S. Application Data

[63] Continuation-in-part of Ser. No. 325,769, Oct. 20, 1994, abandoned.
[51] Int. Cl.$^6$ ............................................ C08G 64/30
[52] U.S. Cl. ..................... 528/196; 528/204; 528/240; 528/371; 528/377; 528/378; 528/379
[58] Field of Search ................................. 528/196, 204, 528/240, 371, 377, 378, 379

[56] References Cited

U.S. PATENT DOCUMENTS

| | | | |
|---|---|---|---|
| 4,366,279 | 12/1982 | Tomioka et al. | 524/289 |
| 4,888,400 | 12/1989 | Boden et al. | |
| 5,097,008 | 3/1992 | Krabbenhoft et al. | 528/371 |

FOREIGN PATENT DOCUMENTS

| | | |
|---|---|---|
| 0111849 | 6/1984 | European Pat. Off. . |
| 0595608 | 4/1994 | European Pat. Off. . |
| 0577849 | 12/1994 | European Pat. Off. . |

*Primary Examiner*—James J. Seidleck
*Assistant Examiner*—John M. Cooney, Jr.
*Attorney, Agent, or Firm*—William H. Pittman

[57] ABSTRACT

Blow moldable polycarbonate is produced by first producing a polycarbonate preform by a melt transesterification process. The polycarbonate preform comprises 2.1 to 10 mole percent polyfunctional branching agent, based on the total moles of polycarbonate in the polycarbonate preform. The polycarbonate preform is then melt equilibrated with a second polycarbonate to produce a blow moldable grade.

18 Claims, No Drawings

BRANCHED POLYCARBONATE PREFORMS, BLOW MOLDABLE POLYCARBONATE AND METHOD FOR MAKING

This application is a continuation-in-part of application Ser. No. 08/325,769 filed Oct. 20, 1994 which is now abandoned.

BACKGROUND OF THE INVENTION

The present invention relates to branched polycarbonate compositions and a method for preparing them. More particularly, it relates to polycarbonate preforms comprising a branching agent and a method of making them via a melt transesterification process. The present invention further relates to a method for making blow moldable polycarbonate by melt equilibrating a mixture comprising a polycarbonate preform and a second polycarbonate. It also relates to the blow moldable polycarbonate which results from the method.

Polycarbonates are well-known high performance engineering thermoplastics characterized by many advantageous physical properties, including optical clarity, toughness, dimensional stability and excellent impact strength over a wide temperature range. To be suitable for use in blow molding applications, the polycarbonate resins must also exhibit sufficient melt strength and viscosity.

In the blow molding process, a tube of molten plastic is extruded from a die that is suspended above a mold. This tube, or parison, is then captured between the halves of the mold. Air is injected into the parison, expanding the plastic and forcing it against the walls of the mold thereby achieving the desired shape. For a resin to be useful in blow molding it must have sufficient melt strength and viscosity to hang from the die until it is captured between the two halves of the mold. It has been found that polycarbonate with a polyfunctional branching agent, such as 1,1,1-tris(4-hydroxyphenyl) ethane, intercondensed into the polymer backbone can provide the necessary melt strength and viscosity to ensure successful blow molding.

In the prior art, polyfunctional branching agents have been incorporated into polycarbonate that has been first polymerized by an interfacial method before introduction of the polyfunctional branching agent. Such a method is disclosed by Krabbenhoft et al. in U.S. Pat. No. 5,097,008 wherein a non-branched cyclic aromatic polycarbonate is contacted with a polyfunctional branching agent under melt polymerization conditions. Similarly, in U.S. Pat. No. 4,888,400, Krabbenhoft et al. contacted a non-branched linear aromatic polycarbonate with a polyfunctional branching agent under melt polymerization conditions. Polycarbonates that are useful in blow molding applications can be made by the two methods of these patents. However the level of branching agent which can be introduced into the polymer with this prior art method is typically below 2.0 mole percent to minimize the risk of gelation.

It would be desirable to produce a preform with a high loading of branching agent, preferably greater than 2.0 mole percent. Such a preform could then be melt equilibrated with any grade of polycarbonate to produce a blow moldable grade.

The prior art requires that branched polycarbonate suitable for blow molding be produced as a separate batch in a single step operation. This requires a manufacturing facility to interrupt production to change over to produce blow moldable grade. After completing the manufacturing run of blow moldable material, it is then necessary to again stop production and change back to produce standard grades.

It would be preferable for a manufacturing plant to continuously produce a standard grade of polycarbonate without interruption. This standard grade could subsequently be melt equilibrated in a separate operation with a preform to produce blow moldable polycarbonate. This would eliminate the need to break into a manufacturing schedule whenever blow moldable polycarbonate is required.

It would be convenient to introduce a multifunctional branching agent via coextrusion with a polycarbonate. However, addition of the multifunctional branching agent monomer to a polycarbonate resin can be accompanied by a reduction of molecular weight compared to the molecular weight of the starting resin. This resin weight reduction is observed with any hydroxy-containing additive or reagent under conditions where the additive will react with the polycarbonate backbone. Branched polycarbonates prepared by the Krabbenhoft methods can also exhibit a reduction in molecular weight and in viscosity after branching when compared to the non-branched starting material. It would also be desirable, therefore, to provide a method of incorporating branching agent into the polycarbonate without significantly reducing the molecular weight or the viscosity in comparison to that of the non-branched polycarbonate resin.

SUMMARY OF THE INVENTION

The present invention provides a method for making a blow moldable polycarbonate comprising the steps of:

a. making a branched polycarbonate preform by contacting a polyfunctional branching agent, a diaryl carbonate, and a dihydric phenol in a melt transesterification process; and, b. melt equilibrating said polycarbonate preform with a second polycarbonate.

Further provided is a method for making a polycarbonate preform comprising the step of contacting a polyfunctional branching agent, a diaryl carbonate and a dihydric phenol in a melt transesterification process, wherein the concentration of polyfunctional branching agent is 2.1 to 10 mole percent, based on the total moles of structural carbonate units in the polycarbonate preform.

The present invention also provides a polycarbonate preform comprising 2.1 to 10 mole percent polyfunctional branching agent, based on the total moles of structural carbonate units in the polycarbonate preform.

DETAILED DESCRIPTION OF THE INVENTION

The present invention provides a method of producing a blow moldable polycarbonate by first producing a polycarbonate preform that comprises more than 2 mole percent branching agent via a melt transesterification process and then melt equilibrating that preform with a second polycarbonate. The present invention further provides the polycarbonate preform and blow moldable polycarbonate.

The polycarbonate preform is produced by synthesizing the polycarbonate at the same time that the branching agent is incorporated. This is accomplished by melt polymerizing a diaryl carbonate, a dihydric phenol and a multifunctional branching agent. The polymerization can be performed at temperatures of 170° C. to 380° C. in the presence of an effective amount of a polymerization catalyst such as tetramethylammonium acetate or tetramethylammonium formate. The necessary amount of polymerization catalyst is determinable by those skilled in the art. A typical amount of catalyst is $0.5 \times 10^{-6}\%$ by weight to $5 \times 10^{-2}\%$ by weight based on the weight of reagents in the melt polymerization mixture.

Additional polymerization catalysts include tetramethylammonium acetate, arylammonium hydroxides, and arylphosphonium hydroxides, carboxylates, phenoxides and borates.

Diaryl carbonates which can be utilized in the production of the polycarbonate preform include, but are not limited to, diphenyl carbonate; di-(halophenyl)carbonates such as di-(chlorophenyl)carbonate and di-(bromophenyl)carbonate; di-(alkylphenyl)carbonates such as di-(tolyl)carbonate, di-(ethylphenyl)carbonate, and di-(cumyl)carbonate; di-(nitrophenyl)carbonate; and mixtures thereof. Preferably, diphenyl carbonate is used.

Among the dihydric phenols that can be used in the practice of the present invention to make the polycarbonate preforms are the following compounds:

resorcinol
4-bromoresorcinol
hydroquinone
4,4'-dihydroxybiphenyl
1,6-dihydroxynaphthalene
2,6-dihydroxynaphthalene
bis (4-hydroxyphenyl)methane
bis (4-hydroxyphenyl)diphenylmethane
bis (4-hydroxyphenyl)-1-naphthylmethane
1,1-bis(4-hydroxyphenyl)ethane
1,2-bis(4-hydroxyphenyl)ethane
1,1-bis(4-hydroxyphenyl)-1-phenylethane
2,2-bis(4-hydroxyphenyl)propane ("bisphenol A")
2-(4-hydroxyphenyl)-2-)3-hydroxyphenyl)propane
2,2-bis(4-hydroxyphenyl)butane
1,1-bis(4-hydroxyphenyl)isobutane
1,1-bis(4-hydroxyphenyl)cyclohexane
1,1-bis(4-hydroxyphenyl)cyclododecane
trans-2,3-bis(4-hydroxyphenyl)-2-butene
2,2-bis(4-hydroxyphenyl)adamantane
α,α'-bis(4-hydroxyphenyl)toluene
bis(4-hydroxyphenyl)acetonitrile
2,2-bis(3-methyl-4-hydroxyphenyl)propane
2,2-bis(3-ethyl-4-hydroxyphenyl)propane
2,2-bis(3-n-propyl-4-hydroxyphenyl)propane
2,2-bis(3- isopropyl-4-hydroxyphenyl)propane
2,2-bis(3- sec -butyl-4-hydroxyphenyl)propane
2,2-bis(3-t-butyl-4-hydroxyphenyl)propane2,2-bis(3-cyclohexyl-4-hydroxyphenyl)propane
2,2-bis(3-allyl-4-hydroxyphenyl)propane
2,2-bis(3-methoxy-4-hydroxyphenyl)propane
2,2-bis(3,5-dimethyl-4-hydroxyphenyl)propane
2,2-bis(2,3,5,6-tetramethyl-4-hydroxyphenyl)propane
2,2-bis(3-5-dichloro-4-hydroxyphenyl)propane
2,2-bis(3,5-dibromo-4-hydroxyphenyl)propane
2,2-bis(2,6-dibromo-3,5-dimethyl-4-hydroxyphenyl)-hydroxyphenyl)-propane
α,α-bis(4-hydroxyphenyl)toluene
α,α,α',α'-Tetramethyl-α,α'-bis(4-hydroxyphenyl)-p-xylene
2,2-bis(4-hydroxyphenyl)hexafluoropropane
1,1-dichloro-2,2-bis(4-hydroxyphenyl)ethylene
1,1-dibromo-2,2-bis(4-hydroxyphenyl)ethylene
1,1-dichloro-2,2-bis(5-phenoxy-4-hydroxyphenyl)ethylene
4,4'-dihydroxybenzophenone
3,3-bis(4-hydroxyphenyl)-2-butanone
1,6-bis(4-hydroxyphenyl)-1,6-hexanedione
ethylene glycol bis(4-hydroxyphenyl)ether
bis(4-hydroxyphenyl)ether
bis(4-hydroxyphenyl)sulfide
bis(4-hydroxyphenyl)sulfoxide
bis(4-hydroxyphenyl)sulfone
bis(3,5-dimethyl-4-hydroxyphenyl)sulfone
9,9-bis(4-hydroxyphenyl)fluorene
2,7-dihydroxypyrene
6,6'-dihydroxy-3,3,3',3'-tetramethylspiro (bis)indane("spirobiindane bisphenol")
3,3-bis(4-hydroxyphenyl)phthalide
2,6-dihydroxydibenzo-p-dioxin
2,6-dihydroxythianthrene
2,7-dihydroxyphenoxathiin
2,7-dihydroxy-9,10-dimethylphenazine
3,6-dihydroxydibenzofuran
3,6-dihydroxydibenzothiophene
2,7-dihydroxycarbazole The preferable dihydric phenol for the manufacture of the polycarbonate preform is 2,2-bis(4-hydroxyphenyl)propane which is also known as bisphenol A.

Any thermally processible and stable trior tetra-substituted branching agent can be utilized as the polyfunctional branching agent in the present invention. Polyhydric phenols suitable as branching agents in the present invention include any trihydric or tetrahydric phenol, for example, 1,1,1-tris-(4-hydroxyphenyl)ethane (or 4,4',4"-ethylidynetrisphenol or THPE); 1,3,5-tris-(2-hydroxyethyl)cyanuric acid (or 1,3,5-tris-(2-hydroxyethyl)-1,3,5-triazine-2,4,6-(1H, 3H, 5H)-trione); 4,6-dimethyl-2,4,6-tri-(4-hydroxyphenyl)heptane; 2,2-bis[4,4'-(dihydroxyphenyl)cyclohexyl]propane; 1,3,5-trihydroxybenzene (phloroglucinol); 1,2,3-trihydroxybenzene (pyrogallol); and 1,4-bis-(4'-4"-dihydroxy-triphenylmethyl)benzene. Such compounds and examples of additional polyfunctional branching agents suitable for use herein and their method of preparation are described, for example, in U.S. Pat. No. 3,799,953 and U.S. Pat. No. Re. 27,682.

Other commercially available polyfunctional branching agents useful herein include, for example, 2',3',4'-trihydroxyacetophenone; 2,3,4-trihydroxybenzoic acid; 2,3,4-trihydroxybenzoic acid; trihydroxybenzophenone; 2,4,4'-trihydroxybenzophenone; 2',4',6'-trihydroxy-3-(4-hydroxyphenyl)propiophenone (phloretin); pentahydroxyflavone; 3,4,5-trihydroxphenylethylamine; 3,4,5-trihydroxyphenethyl alcohol; 2,4,5-trihydroxypyrimidine (isobarbituric acid); tetrahydroxy-1,4-quinone hydrate (tetrahydroxy-1,4-benzoquinone); 2,2',4,4'-tetrahydroxybenzophenone; and 1,2,5,8-tetrahydroxyanthraquinone.

A mixture of two or more of such polyfunctional branching agents may be employed to achieve particularly desired properties in the branched polycarbonate.

While other polyfunctional branching agents suitable for the practice of the present invention will occur to those skilled in the art, 1,1,1-tris-(4-hydroxyphenyl)ethane, also referred to herein as THPE, is preferred because it is readily available at a competitive cost.

Polyfunctional branching agents can be added in quantities up to and including 10 mole percent, based on the total moles of structural carbonate units in the polycarbonate preform. Preferably, the concentration of polyfunctional branching agent is 4 to 6 mole percent, based on the total moles of structural carbonate units in the polycarbonate preform.

To produce blow moldable polycarbonate, the polycarbonate preform is melt equilibrated with a second polycarbonate. The polycarbonate preform is added to the second polycarbonate in quantities sufficient to produce the desired concentration of branching agent in the resulting blow moldable polycarbonate. Typically, the concentration of branching agent in blow moldable polycarbonate ranges from 0.2 mole percent to 0.8 moles percent, based on the total moles of structural carbonate units in the polycarbonate preform. Preferably, the concentration is 0.4 mole percent to 0.5 mole percent, based on the total moles of structural carbonate units in the polycarbonate preform.

The second polycarbonate can be produced by either a melt transesterification process or an interfacial process. Both processes are well known in the art. This second polycarbonate can comprise substantially unbranched polycarbonate. It can also comprise branched polycarbonate that has had branching agent incorporated into the polycarbonate by any method, including the method of the present invention and methods of the prior art such as Krabbenhoft's methods.

The weight average molecular weight ($M_w$) of the polycarbonate preform and of the second polycarbonate can be adjusted by varying the ratio of diaryl carbonate to dihydric phenol. When two distinct polycarbonate resins are mixed together and allowed to equilibrate, the molecular weight distribution of the equilibrated material typically approaches the weighted numeric average of the molecular weights of the two distinct resins. Therefore, it is preferable to create a preform with a molecular weight that is greater than or equal to the molecular weight of the second polycarbonate into which the preform will be melt equilibrated. In this way, the blow moldable polycarbonate that results experiences little or no reduction of molecular weight as a result of the incorporation of the branching agent.

Preferably, the molecular weight ($M_w$) of the polycarbonate preform is 10,000 to 60,000. More preferably, the molecular weight ($M_w$) of the polycarbonate preform is 40,000 to 60,000.

It is preferred that the second polycarbonate have a molecular weight ($M_w$) that ranges from 40,000 to 75,000.

The preferred range of molecular weight ($M_w$) of the blow moldable polycarbonate is 25,000 to 5,000. The more preferred range of molecular weight ($M_w$) of the blow moldable polycarbonate is 40,000 to 5,000.

All of the above molecular weight values are as measured by gel permeation chromatography using polystyrene as the reference material.

EXAMPLE 1

A polycarbonate preform was produced with 4 mole percent branching agent, based on the total moles of carbonate structural units in the polycarbonate preform.

131.5 g (0.576 mol) of 2,2-bis-(4-hydroxyphenyl)propane (BPA), 138.8 g (0.648 mol) of diphenylcarbonate and 7.432 g (0.024 mol) of 1,1,1-tris(hydroxyphenyl)ethane (THPE) were mixed in a one liter glass melt polymerization reactor as powders. The glass reactor surface had been previously passivated via acid washing, rinsing, and subsequent drying. The reactor vessel was deoxygenated by evacuation to about 1 torr and then refilled with purified nitrogen. The reactor vessel was immersed in a fluidized heat bath preheated to 180° C. The reaction mixture was allowed to melt, producing a homogeneous liquid. Upon complete solution, the system was allowed to thermally equilibrate for 5–10 minutes.

An amount of an aqueous solution of ($3 \times 10^{-4}$ mol) of tetramethylammonium hydroxide ($TMAH_{aq}$), which provided $5.0 \times 10^{-4}$ mol/mol BPA equivalents, and 300 µL of a 0.025 M solution of an aqueous NaOH solution, which provided $7.5 \times 10^{-6}$ mol/mol BPA equivalents, was syringed into the above solution. The resulting solution was stirred at 180° C. for 5 min. At this time the reaction temperature was raised to 210° C. and the pressure lowered to 175 mm Hg. Phenol began to distill from the reactor immediately (approx. 3–4 drops/sec.). After 35 min, the reactor pressure was lowered to 100 mm Hg and held there for an additional 35 min. phenol continued to distill into the receiver flask (1–2 drops/sec) during this time and a total volume of 74 mL was collected by the end of the 210° C. stage. The reactor temperature was raised to 240° C. (100 mm Hg) and these conditions maintained for 40 min. During this time period, phenol distilled at an average rate of about 1 drop/3–5 sec (a total of 93 mL was collected to this point). The reaction temperature was raised to 270° C. (15 torr) for 20 min. The final reactor stage was to raise the reactor temperature to 300° C. (1.1 torr) for 25 min. The solution began foaming at this point (a total of 105 mL distillate volume). The solution was allowed to foam for 8 min and then the reaction was terminated. A total of 115.5 grams of distillate was collected during the course of the reaction.

The polycarbonate was dissolved in 1000 mL of methylene chloride and filtered through filter paper (no gelled or insoluble particles were collected). The resultant homogeneous solution was placed into a blender and, while being rapidly stirred, precipitated by the addition of an equivalent volume of methanol. A white suspension was obtained which was filtered using suction filtration. The resultant white powder was dried for 16 h at 70° C. to yield 96.3 g of a polycarbonate preform consisting essentially of about 4 mole percent of chemically combined [1,1,1-tris(hydroxyphenyl)ethane] carbonate units and about 96 mole percent of chemically combined bisphenol A carbonate units. The polycarbonate preform had a molecular weight ($M_w$) of 50,798.

EXAMPLE 2

Branching agent can be incorporated into the polycarbonate preform in concentrations as high as 10 mole percent.

In accordance with the procedure of example 1, 123.2 g(0.540 mole)of BPA, 138.8 g (0.648 mol) of diphenylcarbonate and 18.54 g(0.060 mole) of 1,1,1-tris(hydroxyphenyl)ethane (THPE) were reacted. The reaction mixture was allowed to melt, producing a homogeneous liquid. Upon complete solution, the system was allowed to thermally equilibrate (5–10min). The solution was stirred at 250 rpm.

136 µL of a 2.21M solution of tetramethylammonium formate (TMAF) as a base catalyst was syringed into the solution. The resulting solution was stirred at 180° C. for 5 min. At this time the reaction temperature was raised to 210° C. and the pressure lowered to 175 mm Hg. Phenol began to distill from the reactor immediately (approx. 3–4 drops/ sec.). After 35 min, the reactor pressure was lowered to 100 mm Hg. Phenol continued to distill into the receiver flask (1–2 drops/sec; to a total of 80 mL). The reactor temperature was now raised to 240° C. (15 torr) for 31 min. The total distillate collected to this point was 100 mL. The solution began to foam. The reaction was shut-down immediately. A total of 112.6 grams of distillate was collected during the course of the reaction.

Following the procedure of example 1, 91.6 g of a polycarbonate preform was produced. It consisted essentially of about 10 mole percent of chemically combined [1,1,1-tris(hydroxyphenyl)ethane] carbonate units and about 90 mole percent of chemically combined bisphenol A carbonate units. The preform had a molecular weight ($M_w$) of 10,140.

EXAMPLE 3

(Control)

Concentrations of branching agent significantly greater than 10 mole percent are difficult to incorporate into the polycarbonate preform.

In accordance with the procedure of example 1, a mixture of BPA, diphenylcarbonate and sufficient 1,1,1-tris(hydroxyphenyl)ethane (THPE) to provide 12.0 mol% of THPE based on the total moles of polycarbonate in the resulting preform were reacted. The material gelled during synthesis and so was not evaluated further.

EXAMPLE 4

The polycarbonate preform of example 1 was melt equilibrated with a Lexan® 130 grade polycarbonate, a product of GE Plastics, to produce a blow moldable polycarbonate having 0.45 mole percent THPE branching agent. 250 ppm of tetraethylammonium acetate was used for each melt extrusion. Prior to extrusion, the materials were premixed in a Henschel mixer. The extrusion was run at a feed rate of 12 lb/h with a screw speed between 300–325 rpm with vacuum venting to facilitate removal of triethylamine catalyst by-product.

The resulting blow moldable polycarbonate (c) was compared to the substantially unbranched bisphenol A polycarbonate (a) and to branched bisphenol A polycarbonate (b) obtained by the Krabbenhoft method.

| Preform | Mol % THPE | Mw | OH(ppm) | R* | T(R*: °C.) |
| --- | --- | --- | --- | --- | --- |
| a. | — | none | 51,827 | 250 | 1.6 | 265.3 |
| b. | pure | 0.45 | 48,783 | 760 | 2.5 | 255.2 |
| c. | 4.50% | 0.45 | 50,900 | 570 | 2.8 | 261.2 |

The above results show that the molecular weight of the blow moldable polycarbonate produced using the method of the present invention (c) is not reduced as much as the molecular weight of the branched polycarbonate (b) produced using the method of the prior art when compared to the molecular weight of the starting unbranched polycarbonate (a).

When polycarbonates are manufactured, it is preferred that the number of —OH groups be kept to a minimum. The unbranched polycarbonate (a) had 250 ppm of —OH. The blow moldable polycarbonate of the instant invention (c) had almost one third fewer —OH groups than the branched polycarbonate of the prior art (b).

R* is a measure of the shear thinning behavior of the polymer. Experience has taught that good blow molding performance is obtained when R* is close to 3.0. R* values are obtained by determining the complex viscosity on a Rheometrics Dynamic Spectrometer at 3 different temperatures (typically 230°, 250°, and 270° C.). Using this data fitted to the Arrhenius equation, the optimum processing extrusion temperature is calculated, i.e., that temperature at which the melt viscosity is 20,000 poise at 100 radian/sec. The viscosity at low shear is then calculated at this temperature. R* is calculated by dividing this viscosity by 20,000 poise.

The blow moldable polycarbonate of the present invention (c) exhibits an R* value of 2.8. It is closer to 3.0 than the branched polycarbonate of the prior art (b). The blow moldable polycarbonate of the instant invention is consequently more suitable for blow molding.

T(R*) is an indicator of viscosity. It is necessary for a blow moldable resin to maintain its viscosity. The unbranched resin (a) had a T(R*) greater than 265° C. Using the method of the prior art, the T(R*) of the branched polycarbonate (b) dropped more than 10° C., indicating a viscosity drop in the resin. However, using the method of the present invention, the T(R*) of the resin (c) dropped only 4° C., indicating less of a viscosity drop.

What is claimed is:

1. A method for making a blow moldable polycarbonate comprising the steps of:
   a. making a branched polycarbonate preform by contacting a polyfunctional branching agent in the amount of 2.1–10 mole percent based on carbonate structural units, a diaryl carbonate and a dihydric phenol in a melt transesterification process; and,
   b. melt equilibrating said polycarbonate preform with a second polycarbonate.

2. A method in accordance with claim 1, wherein said contacting is performed at a temperature of 170° C. to 380° C. in the presence of an effective amount of polymerization catalyst.

3. A method in accordance with claim 2, wherein said polymerization catalyst is selected from the group consisting of tetramethylammonium acetate, tetramethylammonium formate, arylammonium hydroxides, and arylphosphonium hydroxides, carboxylates, phenoxides and borates.

4. A method in accordance with claim 1, wherein said diaryl carbonate comprises diphenyl carbonate.

5. A method in accordance with claim 1, wherein said dihydric phenol comprises 2,2-bis(4-hydroxyphenyl)propane.

6. A method in accordance with claim 1, wherein said polyfunctional branching agent is selected from the group consisting of trihydric phenols and tetrahydric phenols.

7. A method in accordance with claim 1, wherein said polyfunctional branching agent comprises 1,1,1-tris-(4-hydroxyphenyl)ethane.

8. A method in accordance with claim 1, wherein said polyfunctional branching agent is added in a quantity of 4 to 6 mole percent, based on the total moles of structural carbonate units in the polycarbonate preform.

9. A method in accordance with claim 1, wherein said polycarbonate preform is melt equilibrated with a second polycarbonate in such quantity as to result in a blow moldable polycarbonate with a concentration of branching agent of 0.2 to 0.8 mole percent, based on the total moles of structural carbonate units in the polycarbonate preform.

10. A method in accordance with claim 1, wherein said polycarbonate preform is melt equilibrated with a second polycarbonate in such quantity as to result in a blow moldable polycarbonate with a concentration of branching agent of 0.4 to 0.5 mole percent, based on the total moles of structural carbonate units in the polycarbonate preform.

11. A method in accordance with claim 1, wherein said second polycarbonate is produced by a melt transesterification process.

12. A method in accordance with claim 1, wherein said second polycarbonate is produced by an interfacial process.

13. A method in accordance with claim 1, wherein said second polycarbonate comprises substantially unbranched polycarbonate.

14. A method in accordance with claim 1, wherein said second polycarbonate comprises branched polycarbonate.

15. A blow moldable polycarbonate made in accordance with the method of claim 1.

16. A method for making a polycarbonate preform comprising the step of contacting a polyfunctional branching agent, a diaryl carbonate and a dihydric phenol in a melt transesterification process, wherein the concentration of polyfunctional branching agent is 2.1 to 10 mole percent, based on the total moles of structural carbonate units in the polycarbonate preform.

17. A method in accordance with claim 16, wherein the concentration of polyfunctional branching agent is 4 to 6 mole percent, based on the total moles of structural carbonate units in the polycarbonate preform.

18. A polycarbonate preform comprising 2.1–10 mole percent polyfunctional branching agent, based on the total moles of structural carbonate units in the polycarbonate preform; said preform prepared by contacting said polyfunctional branching agent with a diaryl carbonate and a dihydric phenol in a melt transesterification process.

* * * * *